United States Patent
Verghese et al.

(10) Patent No.: US 8,552,104 B2
(45) Date of Patent: *Oct. 8, 2013

(54) AMPHIPHILIC BLOCK COPOLYMER-TOUGHENED THERMOSET RESINS

(75) Inventors: Kandathil E. Verghese, Lake Orion, MI (US); Ha Q. Pham, Lake Jackson, TX (US); Jerry E. White, Lake Jackson, TX (US); Frank S. Bates, St. Louis Part, MN (US)

(73) Assignee: Dow Global Technologies LLC, Midlan, MI (US)

( * ) Notice: Subject to any disclaimer, the term of this patent is extended or adjusted under 35 U.S.C. 154(b) by 1347 days.

This patent is subject to a terminal disclaimer.

(21) Appl. No.: 10/589,713

(22) PCT Filed: Mar. 24, 2005

(86) PCT No.: PCT/US2005/009764
§ 371 (c)(1),
(2), (4) Date: Aug. 7, 2008

(87) PCT Pub. No.: WO2005/097893
PCT Pub. Date: Oct. 20, 2005

(65) Prior Publication Data
US 2008/0287595 A1 Nov. 20, 2008

Related U.S. Application Data

(60) Provisional application No. 60/558,978, filed on Apr. 2, 2004.

(51) Int. Cl.
*C08L 53/00* (2006.01)

(52) U.S. Cl.
USPC .............................. 524/505; 525/93

(58) Field of Classification Search
USPC ............................. 524/505; 525/93
See application file for complete search history.

(56) References Cited

U.S. PATENT DOCUMENTS

| 7,670,649 | B2 * | 3/2010 | Hoyles et al. | 427/386 |
| 7,820,760 | B2 * | 10/2010 | Pham et al. | 525/90 |
| 7,923,073 | B2 * | 4/2011 | Verghese et al. | 427/386 |
| 2004/0247881 | A1 * | 12/2004 | Dean et al. | 428/413 |

OTHER PUBLICATIONS

Gronski et al., Macromolecules 2002, 35, 3133-3144.*

* cited by examiner

*Primary Examiner* — Robert D. Harlan

(57) ABSTRACT

A composition comprising (1) a thermosettable resin selected from the group consisting of an epoxy resin, an epoxy vinyl ester resin, an unsaturated polyester resin or a mixture thereof, and (2) an amphiphilic mock copolymer dispersed in the thermosettable resin; fiber-reinforced plastics (FRP), coatings and composites prepared therefrom; and methods of preparing these.

3 Claims, 3 Drawing Sheets

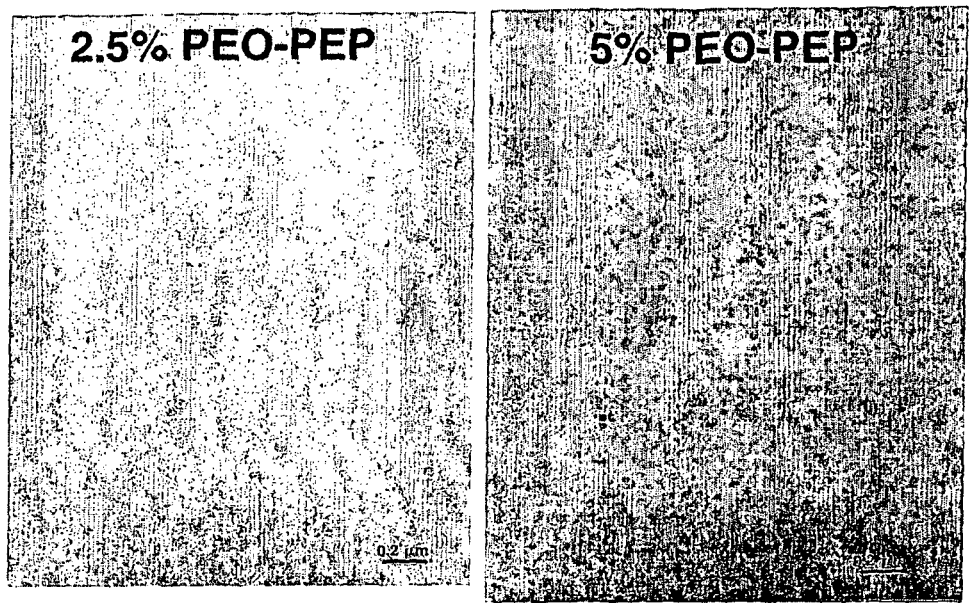
Figure 1: Transmission electron micrographs (TEMs) of well-dispersed nano-structure morphology in DERAKANE 411-350. (a) 2.5 wt.% loading of PEO-PEP and (b) 5 wt.% loading

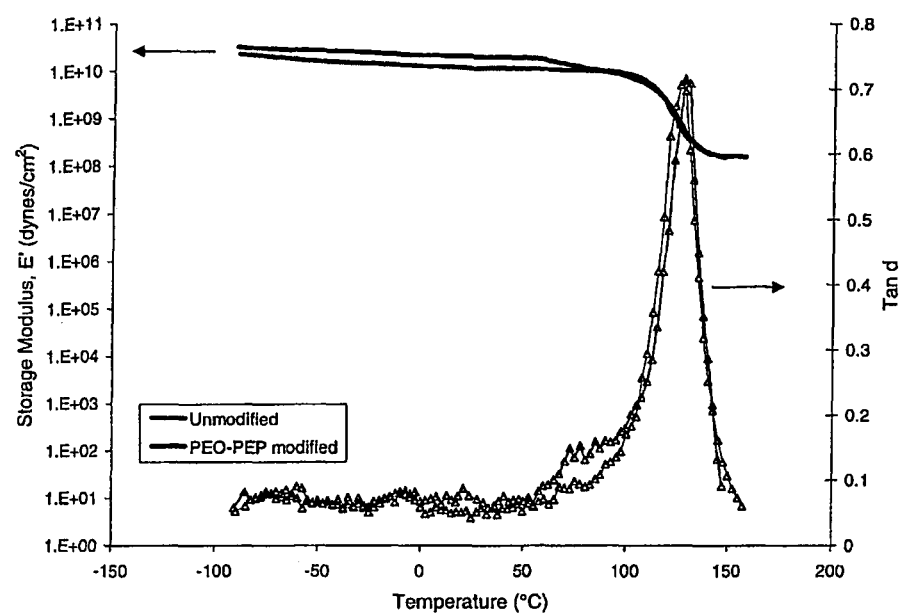
Figure 2: Viscoelastic response for UV cured Epoxy Acrylate films with and without PEO-PEP block copolymer modifier. Tg remains unchanged while modulus at 25°C drops by 40%.

Figure 3: Transmission electron micrograph indicating the presence of nano-scaled architecture in cured Epoxy acrylate films. The presence of voids are also noted and exist in all powder coting applications. The black, high aspect ratio section to the right indicate the presence of filler.

AMPHIPHILIC BLOCK COPOLYMER-TOUGHENED THERMOSET RESINS

BACKGROUND OF THE INVENTION

The present invention relates to thermosettable resins such as epoxy resins, epoxy vinyl ester resins, unsaturated polyester resins, fiber-reinforced plastics (FRP), coatings and composites; and methods of producing these.

Epoxy resins, epoxy vinyl ester resins and unsaturated polyester resins are known for their thermal and chemical resistance. They also display good mechanical properties but they lack toughness and tend to be very brittle. This is especially true as their crosslink density or Tg increases.

Attempts have been made to strengthen or toughen epoxy resins, epoxy vinyl ester resins and unsaturated polyester resins by incorporating therein a variety of elastomeric materials. Examples of toughened epoxy resins are disclosed in U.S. Pat. Nos. 3,923,922; 4,221,697; 4,117,038; 3,856,883; 3,496,250; 4,082,895; 3,496,250; 3,316,195; 3,499,949 and 3,509,086; as well as European Patent Application No. 78,527, published Nov. 5, 1983: and Japanese Patent No. 55-018401.

A summary of epoxy and elastomeric blend technology is provided in Rubber-Modified Thermoset Resins, American Chemical Society (1984). Primarily, attempts to toughen epoxy compounds have focused on employing liquid rubbers, such as carboxyl-terminated butadiene-acrylonitrile copolymers. In certain amine cure systems, the rubber separates into distinct particles. However, the rubber must first be prereacted with the epoxy resin to ensure compatibility, and optimum cure properties, and such rubbers do not exhibit latent reactivity to the resins.

Prior technology required specific curing conditions to be followed in order to develop the right rubber particles morphology and obtain the toughening effect.

It would be desirable to provide a technology which would allow performance of the thermosettable resin blend to be independent from the curing schedule, therefore allowing a more robust coating.

SUMMARY OF THE INVENTION

In a first aspect, the present invention is a composition comprising (1) a thermosettable resin selected from the group consisting of an epoxy resin, epoxy vinyl ester resin, an unsaturated polyester resin or a mixture thereof, and (2) an amphiphilic block copolymer dispersed in the epoxy resin, epoxy vinyl resin, unsaturated polyester resin or a mixture thereof.

In a second aspect, the present invention is a composite comprising (a) a cured thermosettable resin selected from the group consisting of epoxy resin, epoxy vinyl ester resin, unsaturated polyester resin and a mixture thereof, having dispersed therein an amphiphilic block copolymer; and (b) reinforcing fibers embedded in the matrix resin prior to cure.

In a third aspect, the present invention is a powder coating comprising the composition of the first aspect, preferably from epoxy resins, and suitable pigments, catalysts and additives.

In a fourth aspect, the present invention is a process for preparing cured, reinforced toughened epoxy resin, epoxy vinyl ester resin or unsaturated polyester resin-containing laminates, said process comprising (1) blending an amphiphilic block copolymer with at least one curable epoxy resin, epoxy vinyl ester resin, unsaturated polyester resin or a mixture thereof; (2) impregnating reinforcing fibers with the resulting blend in (1); (3) laying up at least two layers of the impregnated fibers to form a laminate; and (4) heating the laminate at a temperature and time sufficient to cure the epoxy resin, epoxy vinyl ester resin, unsaturated polyester resin or a mixture thereof, whereby a cured, reinforced, toughened epoxy resin, epoxy vinyl ester resin, unsaturated polyester resin-containing laminate is obtained.

In a fifth aspect, the present invention is a process for making a composite from thermosettable resins, preferably from an epoxy vinyl ester resin or an unsaturated polyester resin, which comprises:

(1) contacting a reinforcing substrate with a thermoplastic-like tackifier at a temperature above the glass-transition temperature of the tackifier, so that the tackifier adheres to the substrate but remains thermoplastic and capable of further reaction, whereby a preform is made; and (2) contacting one or more of the preforms made in step (1) with a matrix resin comprising a blend of an amphiphilic block copolymer and at least one curable epoxy resin, epoxy vinyl ester resin, unsaturated polyester resin or a mixture thereof, under conditions such that the tackifier and matrix resin are cured, whereby a composite is formed.

Other aspects of the present invention will become apparent from the following detailed description and claims.

BRIEF DESCRIPTION OF THE FIGURES

FIG. 1 describes the block copolymer morphology developed in a fully cured DERAKANE 411-350 vinyl ester resin plaque.

FIG. 2 shows the viscoelastic response of the addition of block copolymer on cured thin films measured using and RSAIII DMTA in tension-tension mode.

FIG. 3 shows via TEM (Transmission Electron Microscopy) the block copolymer morphology in the fully cured films.

DETAILED DESCRIPTION OF THE INVENTION

Epoxy resins useful in this invention include a wide variety of epoxy compounds. Typically, the epoxy compounds are epoxy resins which are also referred to as polyepoxides. Polyepoxides useful herein can be monomeric (for example, the diglycidyl ether of bisphenol A, novolac-based epoxy resins, and tris-epoxy resins), higher molecular weight advanced resins (for example, the diglycidyl ether of bisphenol A advanced with bisphenol A) or polymerized unsaturated monoepoxides (for example, glycidyl acrylates, glycidyl methacrylate, allyl glycidyl ether, etc.) to homopolymers or copolymers. Most desirably, epoxy compounds contain, on the average, at least one pendant or terminal 1,2-epoxy group (that is, vicinal epoxy group) per molecule.

Examples of useful polyepoxides include the polyglycidyl ethers of both polyhydric alcohols and polyhydric phenols; polyglycidyl amines, polyglycidyl amides, polyglycidyl imides, polyglycidyl hydantoins, polyglycidyl thioethers, epoxidized fatty acids or drying oils, epoxidized polyolefins, epoxidized di-unsaturated acid esters, epoxidized unsaturated polyesters, and mixtures thereof. Numerous polyepoxides prepared from polyhydric phenols include those which are disclosed, for example, in U.S. Pat. No. 4,431,782. Polyepoxides can be prepared from mono-, di- and tri-hydric phenols, and can include the novolac resins. Polyepoxides can include the epoxidized cycloolefins; as well as the polymeric polyepoxides which are polymers and copolymers of glycidyl acrylate, glycidyl methacrylate and allylglycidyl ether. Suitable polyepoxides are disclosed in U.S. Pat. Nos. 3,804,735; 3,892,819; 3,948,698; 4,014,771 and 4,119,609; and Lee and Neville, Handbook of Epoxy Resins, Chapter 2, McGraw Hill, N.Y. (1967).

While the invention is applicable to polyepoxides in general, preferred polyepoxides are glycidyl polyethers of polyhydric alcohols or polyhydric phenols having weights per epoxide group of 150 to 2,000. These polyepoxides are usually made by reacting at least two moles of an epihalohydrin or glycerol dihalohydrin with one mole of the polyhydric alcohol or polyhydric phenol, and a sufficient amount of a caustic alkali to combine with the halohydrin. The products are characterized by the presence of more than one epoxide group, that is, a 1,2-epoxy equivalency greater than one.

The polyepoxide useful in the present invention can also be a cycloaliphatic diene-derived epoxide. These polyepoxides can be cured either thermally, cationically or photoinitiation (example UV initiated cure). There are several cycloaliphatic epoxides that are made and marketed by The Dow Chemical Company such as 3,4-epoxycyclohexylmethyl-3,4-epoxycyclohexyl carboxylate; 1,2-epoxy-4-vinylcyclohexane; bis(7-oxabicyclo[4.1.0]hept-3-ylmethyl hexanedioic acid ester; 3,4-epoxycyclohexanecarboxylate methyl ester; and mixtures thereof.

The polyepoxide may also include a minor amount of a monoepoxide, such as butyl and higher aliphatic glycidyl ethers, phenyl glycidyl ether, or cresyl glycidyl ether, as a reactive diluent. Such reactive diluents are commonly added to polyepoxide formulations to reduce the working viscosity thereof, and to give better wetting to the formulation. As is known in the art, a monoepoxide affects the stoichiometry of the polyepoxide formulation and adjustments are made in the amount of curing agent and other parameters to reflect that change.

The epoxy vinyl ester resins which can be employed in the practice of the present invention are described in U.S. Pat. No. 6,329,475. Preferred epoxy vinyl ester resins are those supplied by The Dow Chemical Company under the trademark DERAKANE. Particularly preferred is the general purpose resin known as DERAKANE 411-45 epoxy vinyl ester resin, which contains approximately 45 percent monomeric styrene. Other DERAKANE epoxy vinyl ester resins which can be employed, for example, include DERAKANE 411-C-50 epoxy vinyl ester resin containing approximately 50 percent monomeric styrene; DERAKANE 470-36 epoxy vinyl ester resin containing approximately 36 percent monomeric styrene; DERAKANE 470-30 epoxy vinyl ester resin containing approximately 30 percent monomeric styrene; DERAKANE 510-A-40 epoxy vinyl ester resin, a brominated vinyl ester resin containing approximately 40 percent monomeric styrene; DERAKANE 790 epoxy vinyl ester resin containing approximately 45 percent monomeric styrene; and DERAKANE 8084 epoxy vinyl ester resin, a fluidized epoxy vinyl ester resin containing approximately 40 percent monomeric styrene.

The unsaturated polyester resins which can be employed in the practice of the present invention are well known. They contain carboxylic ester groups and carbon-carbon double bonds as recurring units along the polymer backbone. They are usually prepared by condensation of (a) ethylenically unsaturated dicarboxylic or polycarboxylic acids or anhydrides to impart the unsaturation, (b) saturated dicarboxylic acids to modify the resin, and (c) diols or polyols. The unsaturated polyesters have the general structural formula:

$$(R\!-\!O\!-\!C(\!=\!O)\!-\!R'\!-\!C(\!=\!O)\!-\!O)_x(R\!-\!O\!-\!C(\!=\!O)\!-\!CH\!=\!CH\!-\!C(\!=\!O)\!-\!O)_y$$

wherein R and R' are alkylene or arylene radicals in the diol and saturated acid respectively, and x and y are variable numbers which depend upon the composition and condensation conditions.

Typical di- or polycarboxylic acids or anhydrides thereof used in the preparation of the unsaturated polyesters include phthalic acids, iso- or terephthalic acid, adipic acid, succinic acid, sebacic acid, maleic acid, fumaric acid, citraconic acid, chloromaleic acid, allylsuccinic acid, itaconic acid, mesaconic acid, citric acid, pyromellitic acid, trimesic acid, tetrahydrophthalic acid, thiodiglycollic acid. These acids and anhydrides may be independently or jointly used.

Typical di- or polyhydric compounds used in the preparation of the unsaturated polyesters include ethylene glycol, diethylene glycol, triethylene glycol, propylene glycol, dipropylene glycol, glycerol, 2-butene-1,4-diol, hydrogenated bisphenol A, bisphenoldioxyethyl ether, bisphenoldioxypropyl ether, and neopentyl glycol.

A variety of reactive diluents or monomers can be added to the unsaturated polyesters to lower their viscosity and to produce a thermoset product. In general, the reactive diluents or monomers are employed in an amount of from 10 to 25 parts by weight, preferably from 10 to 20 parts by weight per 100 part by weight based on the total weight of the curable composition excluding the weight of any reinforcing particles present in the composition. Specific examples of such reactive monomers include styrene, chlorostyrenes; methyl styrenes such as s-methyl styrene and p-methyl styrene; vinyl benzyl chloride, divinyl benzene, indene, allyl styrene, allyl benzene; unsaturated esters such as methyl methacrylate, methyl acrylate and other lower aliphatic esters of acrylic and methacrylic acids; allyl acetate, diallyl phthalate, diallyl succinate, diallyl adipate, diallyl sebacate, diethylene glycol bis (allyl carbonate), triallyl phosphate and diethylene glycol bis(allyl carbonate); triallyl phosphate and other allyl esters; and vinyl toluene, diallyl chloroendate, diallyl tetrachlorophthalate, ethylene glycol diethacrylate; and amides such as acrylamides; vinyl chloride, and mixtures thereof. Among these examples, styrene is preferred.

Curing catalysts can also be added to the unsaturated polyesters, epoxy vinyl ester resins or mixtures thereof, or other mixtures where at least one component is an unsaturated polyester or epoxy vinyl ester resin. Examples of such curing catalyst include free radical initiators, such as azo compounds including azoisobutyronitrile, and organic peroxides, such as tertiary-butyl perbenzoate, tertiary-butyl peroctoate, benzoyl peroxide; methyl ethyl ketone peroxide, acetoacetic peroxide, cumene hydroperoxide, cyclohexanone hydroperoxide, and dicumyl peroxide. Methyl ethyl ketone peroxide and benzoyl peroxide are preferred. Preferably, the catalyst is used in an amount of from 0.03 to 2.5 parts by weight based on the total weight of the curable composition, excluding the weight of any reinforcing particles present in the composition.

The amphiphilic block copolymers which can be employed in the practice of the present invention include, but are not limited to, poly(isoprene-block-ethylene oxide) block copolymers (PI-b-PEO), poly(ethylene propylene-b-ethylene oxide) block copolymers (PEP-b-PEO), poly(butadiene-b-ethylene oxide) block copolymers (PB-b-PEO), poly(isoprene-b-ethylene oxide-b-isoprene block copolymers (PI-b-PEO-PI), and poly(isoprene-b-ethylene oxide-methylmethacrylate) block copolymers (PI-b-PEO-b-PMMA). Additionally, preferred amphiphilic block copolymers would include the above-identified block copolymers wherein the PEO is replaced by any suitable hydrophilic polymer. The most preferred amphiphilic block copolymer useful in this invention is poly(ethylene oxide)-b-poly(ethylene-alt propylene) (PEO-PEP).

The amount of amphiphilic block copolymers employed in the practice of the present invention depends on a variety of factors including the equivalent weight of the polymers in the coating, as well as the desired properties of the products made from the composition. In general, the amount of amphiphilic block copolymers employed is from 0.1 to 30 weight percent, preferably from 2 to 10 weight percent and, most preferably, from 2.5 to 5 weight percent, based on the weight of the resin composition.

The epoxy composition of the present invention can be used in a variety of industrial applications or other epoxy applications such as coatings, composites, laminates such as electrical laminates, glass fiber sizing and gloss reduction aids in coatings, encapsulants.

Coatings

Industrial coatings are surface protective coatings (paint coatings) applied to substrates and typically cured or crosslinked to form continuous films for decorative purposes as well as to protect the substrate. A protective coating ordinarily comprises an organic polymeric binder, pigments, and various paint additives, where the polymeric binder acts as a fluid vehicle for the pigments and imparts rheological properties to the fluid paint coating. Upon curing or crosslinking, the polymeric binder hardens and functions as a binder for the pigments and provides adhesion of the dried paint film to the substrate. The pigments may be organic or inorganic and functionally contribute to opacity and color in addition to durability and hardness. The manufacture of protective coatings involves the preparation of a polymeric binder, mixing of component materials, grinding of pigments in the polymeric binder, and possible thinning to commercial standards.

Epoxy powder paints can be obtained which comprise the composition of the present invention and suitable pigments, catalysts and additives. These powder paints and coatings therefrom have a surprisingly good combination of highly prized properties. Depending on the choice and the amount of polymer, crosslinker, catalyst and other components, one can obtain, for example, good flow, good chemical resistance, high gloss, high scratch resistance, good mechanical properties, good outdoor durability and good color stability.

Composites

The process for preparing composites is known and is described, for example, in U.S. Pat. No. 5,427,726.

In general, composites can be prepared from the composition of the present invention by:

(1) contacting a reinforcing substrate with a tackifier at a temperature above the glass-transition temperature of the tackifier, so that the tackifier adheres to the substrate but remains thermoplastic and capable of further reaction, whereby a preform is made; and (2) contacting one or more of the preforms made in step (1) with a matrix resin comprising a blend of an amphiphilic block copolymer and at least one curable epoxy resin, epoxy vinyl ester resin, or unsaturated polyester resin under conditions such that the tackifier and matrix resin are cured, whereby a composite is formed.

As used herein, the term "tackifier" means a resin that exhibits thermoplastic properties, such as resins possessing a glass-transition temperature and/or a melting point below the temperature that cures the resin. The tackifier can also be a thermoplastic-like resin. A "thermoplastic-like" resin is a thermosetting resin that exhibits thermoplastic properties, such as a glass-transition temperature and/or a melting point, so that the resin is thermoformable. The glass-transition temperature or melting point should be low enough so that the thermoplastic-like resin cures slowly or not at all, so that the resin can be thermoformed without completely curing the resin.

Tackifiers which can be employed in the practice of the present invention in making the preforms are those resinous compounds which are also compatible with the compounds used in subsequent molding processes where the preforms are employed. Suitable tackifiers include, for example, epoxy resins, vinyl ester resins, unsaturated polyester resins, polyimides, bismaleimides, polycyanate ester resins, benzocyclobutene resins and combinations thereof.

Laminates

Electrical laminates can be prepared by impregnating a base material with the epoxy composition of the present invention, followed by curing of the composition.

The base materials which can be impregnated with the composition of the present invention include cellulosic base materials such as kraft paper and linter paper, glass base materials such as glass cloth, glass nonwoven fabric, and glass mixed paper.

When cellulosic papers are used, it is preferable to treat the cellulose papers with melamine resin or the like previous to impregnation of the resin composition.

When glass base materials are used, it is preferable to treat the glass base materials with a coupling agent such as vinyl silane previously.

The epoxy resin, vinyl ester resin or unsaturated polyester resin composition of the present invention (A-stage) is cured by exposure to heat at a temperature of from 120° C. to 260° C., leading to a C-stage resin (fully cured resin or cured to the maximum extent of cure achievable, laminate).

The following working examples are given to illustrate the invention and should not be construed as limiting its scope. Unless otherwise indicated, all parts and percentages are by weight.

EXAMPLE 1

Use of the Block Co-Polymer in Epoxy Vinyl Ester in Composites

Preparation of Blends:

DERAKANE™ MOMENTUM™ 411-350 vinyl ester resin (120 grams) was poured into a screw cap 8-ounce bottle. PEO-PEP block copolymer (6 and 3 grams) was added to attain a 5 percent and 2.5 percent loading concentration respectively. The bottle was closed and the mixture was agitated at room temperature over a roller bed for approximately 8-10 hours. Performing this operation under an infrared heating lamp will accelerate the mixing process cutting back the time to 2-3 hours. The mixture was catalyzed with methylethyl ketone peroxide, degassed by centrifuging and then poured into a two-part mold. The mold was assembled prior to the mixing operation and comprises a metal base plate, picture frame to provide the appropriate thickness, and a cover plate. Durafoil was used as the contact surfaces in order to facilitate easy removal of the casting after complete cure. The entire assembly was held in place by a series of mechanical fasteners. The cure cycle involves room temperature cure for 24 hours followed by a post cure for 3 hours at 100° C. Upon full cure, the sample was slowly cooled to room temperature and the mold assembly is disassembled to remove the clear casting. The resulting casting was approximately 3.2 mm thick.

™Trademark of The Dow Chemical Company

Rectangular samples roughly 12 mm wide and 25 mm long were cut for DMTA (Dynamic Mechanical Thermal Analysis). These experiments were executed on a Rheometrics ARES rheometer using the solid-state rectangular sample fixture. Fixed frequency (1 Hz) torsional-mode experiments were run by first cooling the sample down to −110° C. and then applying a steady temperature ramp of 3° C./min to 220° C. A second scan was always run to ensure that full cure had occurred and to also observe if any changes had occurred to the main transitions during the first scan. Fracture tests were run on a servo-hydraulic Instron test frame on compact tension specimens 25 mm wide and 25 mm high. A chevron notch was first machined in followed by a starter crack that was prepared by carefully inserting a razor blade into the chevron notch. Samples were then gripped and tested in accordance with ASTM D 5045 test standard. Finally after failure, the samples were subjected to a forensic study of the fracture surface to investigate the morphology at the surface as well as in the bulk. Table 1 lists the key physical and mechanical data collected on this particular system. FIG. 1 describes the block copolymer morphology developed in a fully cured DERAKANE 411-350 plaque.

Similar results have been collected using unsaturated polyester and similar toughness improvements have been found at corresponding loading levels. For example at 2.5 percent PEO-PEP loading a 26 percent improvement in $K_{Ic}$ could be observed. As indicated in the table, all samples maintained their transparency upon full cure.

EXAMPLE 2

Use of the Block Co-Polymer in UV Cured Epoxy Coatings

The UV-cured epoxy coating was a standard black UV cure powder coating comprising Irgacure 819 (Bis(2,4,6-trimethylbenzoyl)-phenylphosphineoxide), Irgacure 2959 (1-[4-(2-hydroxyethoxy)-phenyl]-2-hydroxy-2-methyl-1-propanenone) and XZ 92478.00 (a two functional solid epoxy acrylate with a Tg of 40° C.). The powder coating was prepared by melt-blending the ingredients in a PRIZM 24 mm extruder, re-solidifying the molten blend in a chilled roll flaker and then grinding the resulting flakes in a Hosokawa ACM-2 grinder.

Procedure for Modifying the UV-Cured Epoxy Coating 9.5 grams of the powder coating prepared above was added to an aluminum pan. The pan was placed over a hot plate at 150° C. until the powder was totally molten. The pan was placed in the analytical scale and a 0.5 gram sample of the PEO-PEP block copolymer was added to the pan. The pan was placed back over the hot plate and the molten powder stirred with cone spindle attached to low speed motor for 5 minutes. The sample was cooled down to re-solidify and then ground in small laboratory grinder (coffee grinder) to a fine powder.

Spraying

Samples of the modified and unmodified UV-cured epoxy coating compositions were electrostatically sprayed in a Nordson Sure Coat spray gun set to 75 KV over a tin-coated plate. The samples were placed in the convection oven for 2 minutes at 130° C. for melt/flow and coat the substrate. Then they were submitted to UV radiation (gallium doped mercury bulb (V type), 300 W/in at 5 ft/min. Last, the free films were stripped out of the plates using metallic mercury to amalgamate the tin layer and release the film.

As shown in FIG. 2, the glass transition temperature (Tg) remains unchanged at 126° C., and the glassy modulus at 25° C. decreases by 40 percent. This drop, while being marginal, tremendously improves the flexibility of the coating. No change in cross-link density takes place as observed through the post Tg rubbery storage modulus curves. FIG. 3 shows via TEM the block copolymer morphology in the fully cured films. Dynamic mechanical spectroscopy indicates there is no drop in glass transition, Tg.

Transmission Electron Microscopy (TEM) is a well known microscopy technique and is described, for example, in U.S. Pat. No. 6,287,992.

TABLE 1

PEO-PEP block co-polymer with DERAKANE MOMENTUM 411-350

|  | 0% Loading | 2.5% Loading | 5% Loading |
| --- | --- | --- | --- |
| ARES Steady Shear Viscosity (Pa-sec) | 0.43 | 1.16 | 1.43 |
| Casting Appearance | Transparent | Transparent | Transparent |
| DMTA Tg (C) | 125 | 124 | 119 |
| DMTA beta (C) | −80 | −81 | −82 |
| DMTA (other) | none | sub-ambient shoulder | sub-ambient shoulder |
| Fracture Toughness, $K_c$ (MPa·m$^{0.5}$) | 0.73 | 1 | 1.4 |
| Fracture Toughness, $G_c$ (J/m$^2$) | 137 | 260 | 496 |

What is claimed is:

1. A composition comprising (1) a thermosettable resin selected from the group consisting of an epoxy resin, epoxy vinyl ester resin, unsaturated polyester resin or a mixture thereof and (2) an amphiphilic block copolymer dispersed in the thermosettable resin; wherein the epoxy vinyl ester resin is selected from the group consisting of epoxy vinyl ester resin containing 45 percent monomeric styrene, epoxy vinyl ester resin containing 50 percent monomeric styrene; epoxy vinyl ester resin containing 36 percent monomeric styrene; epoxy vinyl ester resin containing 30 percent monomeric styrene; a brominated vinyl ester resin containing 40 percent monomeric styrene; epoxy vinyl ester resin containing 45 percent monomeric styrene; and a fluidized epoxy vinyl ester resin containing 40 percent monomeric styrene.

2. A composition comprising (1) a thermosettable resin selected from the group consisting of an epoxy resin, epoxy vinyl ester resin, unsaturated polyester resin or a mixture thereof and (2) an amphiphilic block copolymer dispersed in the thermosettable resin; wherein the unsaturated polyester resin has the general structural formula:

(R—O—C(=O)—R'—C(=O)—O)$_x$(R—O—C(=O)—CH=CH—C(=O)—O)$_y$ wherein R and R' are alkylene or arylene radicals in the diol and saturated acid respectively, and x and y are variable numbers which depend upon the composition and condensation conditions.

3. A composition comprising (1) a thermosettable resin selected from the group consisting of an epoxy resin, epoxy vinyl ester resin, unsaturated polyester resin or a mixture thereof and (2) an amphiphilic block copolymer dispersed in the thermosettable resin; wherein the unsaturated polyester resin is prepared by condensation of (a) ethylenically unsaturated dicarboxylic or polycarboxylic acids or anhydrides to impart the unsaturation, (b) saturated dicarboxylic acids to modify the resin, and (c) diols or polyols.

* * * * *